United States Patent [19]

Gorton

[11] 3,932,335

[45] Jan. 13, 1976

[54] ADHESIVE COMPOSITION OF VINYL ESTER POLYMER, POLYVINYL ALCOHOL, GLYOXAL, AND A WATER MISCIBLE ALCOHOL

[75] Inventor: Bert Sorelle Gorton, Kennett Square, Pa.

[73] Assignee: E. I. Du Pont de Nemours & Company, Wilmington, Del.

[22] Filed: June 29, 1970

[21] Appl. No.: 50,896

[52] U.S. Cl. .......................... 260/29.6 WA; 161/251; 260/29.6 ME; 260/33.4 R
[51] Int. Cl.² .......................................... C08L 31/04
[58] Field of Search ............... 260/29.6 WA, 33.4 R

[56] References Cited
UNITED STATES PATENTS

| 3,094,500 | 6/1963 | Herman | 260/29.6 WA |
| 3,256,221 | 6/1966 | Cooper | 260/17 |
| 3,298,987 | 1/1967 | Colgan et al. | 260/29.6 WA |
| 3,573,236 | 3/1971 | Barlow | 260/29.6 WA |
| 3,600,342 | 8/1971 | Nickerson et al. | 260/29.6 WA |

OTHER PUBLICATIONS

Davidson et al. Water Soluble Resins, Second Edition, 1968, p. 110.
Stille, Introduction to Polymer Chemistry, 1962, p. 177.

*Primary Examiner*—Harold D. Anderson

[57] ABSTRACT

A water-resistant adhesive composition consisting essentially of a vinyl ester polymer, a polyvinyl alcohol in an amount from about 2 to 10 percent by weight of the polymer, glyoxal in an amount from about 2 to 15 percent by weight of the polymer and a water-miscible alcohol in an amount from about 3.5 to 17.0 percent by weight of the polymer is provided. This composition in emulsion form has improved viscosity stability and coagulation resistance, and improved water resistance when applied as an adhesive.

8 Claims, No Drawings

ADHESIVE COMPOSITION OF VINYL ESTER POLYMER, POLYVINYL ALCOHOL, GLYOXAL, AND A WATER MISCIBLE ALCOHOL

BACKGROUND OF THE INVENTION

1. Field of Invention

This invention relates generally to adhesive compositions and more particularly to adhesive compositions based on vinyl ester polymer dispersions.

2. Description of Prior Art

Aqueous dispersions containing vinyl ester polymers, for example, vinyl acetate polymers or copolymers, are well known and have found particular utility in adhesive applications. For such uses it has been customary to polymerize or copolymerize vinyl acetate in an aqueous medium containing polymerization initiators and water-soluble protective colloids. Many of the problems associated with the preparation of useful dispersions have been discussed in a variety of patents, among which the following are included: U.S. Pat. No. 2,227,163 issued to Werner Starik and Heinrich Freudenberger on Dec. 31, 1940; U.S. Pat. No. 2,398,344 issued to Henry M. Collins and Mogens Kiar on Apr. 16, 1946; U.S. Pat. No. 2,388,600 issued to H. M. Collins on Nov. 6, 1945; U.S. Pat. No. 2,892,802 issued to Eugene P. Budewitz on June 30, 1959; U.S. Pat. No. 2,956,962 issued to Samuel P. Wise on Oct. 18, 1960; U.S. Pat. No. 3,094,500 issued to Stedman C. Herman on June 18, 1963, and Canadian Pat. No. 812,285.

One such problem in providing a suitable adhesive based on a vinyl acetate polymer has been improving the viscosity stability and coagulation resistance of the adhesive dispersion while maintaining improved water resistance of the adhesive after it has been deposited from the dispersion. Viscosity stability and coagulation resistance of the adhesive dispersion should be maintained both during and after preparation and should not be materially affected by either aging at elevated temperatures or freezing.

SUMMARY OF THE INVENTION

According to the present invention, there is provided a water-resistant adhesive composition consisting essentially of a vinyl ester polymer, a polyvinyl alcohol in an amount from about 2 to 10 percent by weight of the polymer, glyoxal in an amount from about 2 to 15 percent by weight of the polymer, and a water-miscible alcohol in an amount from about 3.5 to 17.0 per cent by weight of the polymer. This adhesive composition has an improved viscosity stability and coagulation resistance, maintains these improvements when subjected to aging at elevated temperatures or freezing, and has an improved water resistance after it has been deposited from the dispersion.

There is also provided an aqueous dispersion consisting essentially of the above adhesive composition.

There is also provided a material having thereon the above adhesive composition.

There is also provided an improvement in the process of preparing a water-resistant adhesive composition wherein a vinyl ester is polymerized in an aqueous dispersion containing polyvinyl alcohol and glyoxal is added to the polymer dispersion. The improvement comprises adding a water-miscible alcohol to the polymer dispersion.

DESCRIPTION OF THE PREFERRED EMBODIMENTS

As used herein, the term "consisting essentially of" means that the named ingredients are essential; however, other ingredients which do not prevent the advantages of the invention from being realized can also be included. Thus, while the vinyl ester polymer, polyvinyl alcohol, glyoxal and water-miscible alcohol are recited as being essential ingredients, other ingredients commonly found in vinyl ester polymer adhesives can also be included in the presently claimed adhesives. Among other such ingredients are initiators and activators not consumed in the polymerization process, buffers, preservatives and fillers. Also, the present adhesives can contain water-soluble surfactants. However, the presence of surfactants is not ordinarily desirable, especially where a high degree of water resistance is required.

Methods of preparing adhesives based on vinyl ester polymers by dispersion polymerization are well known and any of the customary techniques can be used; however, preferred methods are disclosed in U.S. patent applications Ser. No. 795,057, filed Jan. 29, 1969, now U.S. Pat. No. 3,534,009, and Ser. No. 850,649, filed Aug. 15, 1969, now abandoned, by A. Beresniewicz and assigned to the assignee of the present application. The aqueous polymer dispersion in which these adhesives are prepared contain at least about 60 weight percent of polymerized vinyl ester. While vinyl acetate is the preferred vinyl ester, other vinyl esters such as vinyl formate, vinyl propionate, vinyl butyrate, as well as higher vinyl esters such as vinyl stearate and vinyl palmitate are also useful. The vinyl ester polymer can be a homopolymer of a particular vinyl ester or it can be the product of the copolymerization of a vinyl ester with another vinyl ester or with one or more additional ethylenically unsaturated copolymerizable monomers. Among others, useful additional copolymerizable monomers include acrylates, such as methyl acrylate, ethyl acrylate, 2-ethylhexyl acrylate; methacrylates such as methyl methacrylate, ethyl methacrylate, 2-ethylhexyl methacrylate; carboxylic acids such as acrylic acid and methacrylic acid, other vinyl compounds such as vinyl chloride, vinylidene chloride, and olefins such as ethylene and the butenes.

Of the above copolymerizable monomers, ethylene has been found to be particularly suitable. In combination with vinyl acetate, ethylene is ordinarily copolymerized in an amount of about 5 to 40 percent by weight and preferably 10 to 20 percent by weight. A particularly useful method for preparing vinyl acetate-/ethylene copolymer adhesives involves an aqueous dispersion technique wherein the monomers are polymerized under an ethylene pressure of about 100 to 1000 psig at a temperature of about 40° to 80°C. Particularly useful catalyst systems for this polymerization include persulfates or peroxides used with or without reducing agents such as bisulfites or formaldehyde sulfoxylates.

In order to prepare the present adhesives, vinyl ester is polymerized in an aqueous dispersion containing polyvinyl alcohol, a protective colloid usually derived from polyvinyl acetate. The polyvinyl alcohol is the result of the hydrolysis, alcoholysis or saponification of polyvinyl acetate such that at least 88% of the acetate groups are replaced by hydroxy groups. Hereinafter, such polyvinyl alcohols will be referred to as hydrolyzed polyvinyl alcohols. The present adhesives contain partially hydrolyzed (88%) and/or essentially completely hydrolyzed (over 99%) polyvinyl alcohol. The polyvinyl alcohol content of the dispersion will generally range from about 2 to 10 percent by weight of the vinyl ester polymer. However, best results are obtained when the polyvinyl alcohol concentration is about 3 to 6 percent by weight.

Glyoxal in an amount from about 2 to 15, preferably from about 7 to 10, percent by weight of the polymer, and the water-miscible alcohol in an amount from about 3.5 to 17.0, preferably from about 7 to 10, percent by weight of the polymer are then added to the adhesive dispersion. The water-miscible alcohol is added in an amount of at least 3.5 percent by weight in order to improve the stability of the adhesive dispersion. Amounts in excess of about 17.0 percent by weight, however, ahould be avoided since the presence of such amounts of water-miscible alcohol will cause the dispersion to lose its tack qualities. The glyoxal and water-miscible alcohol can be premixed and added to the dispersion simultaneously or they can be added separately. When the water-miscible alcohol is added prior to the addition of glyoxal, the alcohol should be diluted with water in order to prevent polymer kick out.

The water-miscible alcohol can be at least on alcohol having 1-3 carbon atoms selected from the group consisting of methanol, ethylene glycol, propylene glycol, ethanol, isopropanol and n-propanol. Methanol is preferred because of commercial availability.

The adhesives of this invention are good bonding agents for various materials, e.g., film, foil, paper, cloth, leather, wood and ceramic substrates. Examples of their use include wet-bonding and heat-sealing adhesives for folding cartons, bags, cups, labels, tubes, film and foil laminations; all-purpose glues; woodworking and other industrial adhesives. They may be applied by conventional methods such as roll coating and spray coating.

Dispersions consisting essentially of the adhesives of the present invention have the advantages of good stability and high solids content. Solids content will range from 40 to 60 percent by weight and will usually be in the range of 55 to 60 percent. These adhesives possess excellent water resistance when deposited from the dispersions as shown in Example 1.

The following example describes the use of methanol and ethylene glycol for improving the stability of blends of glyoxal with vinyl acetate/ethylene/polyvinyl alcohol emulsions while maintaining improved water resistance.

EXAMPLE 1

A sample of 10grams of a 40% aqueous solution of glyoxal was blended with 100 grams of a 55% solids containing emulsion of an ethylene/vinyl acetate copolymer emulsion containing approximately 13 percent by weight ethylene and 87 percent by weight vinyl acetate in which 5 percent by weight of an 88 percent hydrolyzed polyvinyl alcohol is used as the protective colloid. The blend was then used to make a lap joint using wet strength Kraft paper with a basis weight of 60 lb./3,000 sq. ft. The joint was made using a number 24 RDS wire wound rod for coating the blend onto one strip of the paper and then immediately laying and rolling a second sheet of paper on top in order to give a one-inch overlap of bonded area. The bonded sheets were allowed to air dry for 21 days at room temperature and a one-inch wide lap joint was cut from the sheet (thus giving 1 sq. in. of bonded area). The joint was then immersed in water at room temperature with a 350 g. weight attached to the lower end of the lap joint. The joint lasted over 8 hours but failed before 24 hours had elapsed.

A second blend was prepared by first adding 10 g. of methanol to 10 g. of a 40 % solution of glyoxal and then adding the alcohol-glyoxal blend to 100 g. of the above 55% solids emulsion. A 1-sq. in. lap joint was prepared and tested in the same manner as described above. The joint passed 24 hours in water without failing.

A third blend was prepared in which 10 g. of ethylene glycol was added to the 10 g. of 40% glyoxal solution before blending with 100 g. of emulsion. A 1-sq. inch lap joint which was prepared and tested in the same manner as described above also passed 24 hours in water without failing.

The difference in stability of the blends was shown by accelerating aging of the blends in sealed containers in an oven at 60°C. for two weeks. At the end of that time, the emulsion containing only the glyoxal had jelled while the two emulsions containing either methanol or ethylene glycol were both fluid, having viscosities of 395 cps. and 485 cps., respectively, at 20 rpm. on a Brookfield viscometer. Further stability of the alcohol containing blends was evident when the blends were cold aged at −18°C. for 18 hours. The sample containing only the glyoxal was in a jelled state even after rewarming to room temperature. The two blends containing the added methanol and ethylene glycol were still fluid even after 5 cycles of freezing at −18°C. for 18 hours and thawing at 23°C. for 6 hours.

What is claimed is:

1. An aqueous dispersion of a water-resistant adhesive composition consisting essentially of a homo- or copolymer of a vinyl ester of aliphatic monocarboxylic acid, polyvinyl alcohol in an amount from about 2 to 10 percent by weight of the polymer, glyoxal in an amount from about 2 to 15 percent by weight of the polymer and a water-miscible alcohol having 1-3 carbon atoms in an amount from about 3.5 to 17.0 percent by weight of the polymer.

2. The adhesive composition of claim 1 wherein the vinyl ester is vinyl acetate.

3. The adhesive composition of claim 2 wherein the vinyl acetate polymer is a copolymer containing 60 to 95 weight percent vinyl acetate and 40 to 5 weight percent of an ethylenically unsaturated copolymerizable monomer.

4. The adhesive composition of claim 3 wherein the ethylenically unsaturated copolymerizable monomer is ethylene and the polyvinyl alcohol is at least 88 percent hydrolyzed polyvinyl alcohol.

5. The adhesive composition of claim 4 wherein the polyvinyl alcohol is present in an amount from about 3 to 6 percent, the glyoxal is present in an amount from about 7 to 10 percent and the water-miscible alcohol is at least one alcohol selected from the group consisting of methanol, ethylene glycol, propylene glycol, ethanol, isopropanol and n-propanol and is present in an amount from about 7 to 10 percent.

6. The adhesive composition of claim 5 wherein the water-miscible alcohol is methanol.

7. An adhesive composition consisting essentially of an ethylene/vinyl acetate copolymer, said copolymer containing ethylene in an amount from about 40 to 5 percent by weight of the copolymer and vinyl acetate in an amount from about 60 to 95 percent by weight of the copolymer, polyvinyl alcohol in an amount from about 2 to 10 percent by weight of the copolymer, glyoxal in an amount from about 2 to 15 percent by weight of the copolymer and methanol in an amount from about 3.5 to 17.0 percent by weight of the copolymer.

8. The adhesive composition of claim 7 wherein the polyvinyl alcohol is present in an amount from about 3 to 6 percent, the glyoxal is present in an amount from about 7 to 10 percent and the methanol is present in an amount from about 7 to 10 percent.

* * * * *